US009224551B2

(12) United States Patent
Rueblinger et al.

(10) Patent No.: US 9,224,551 B2
(45) Date of Patent: *Dec. 29, 2015

(54) TRIGGER MECHANISM FOR HAND HELD DEVICES (71) Applicant: Metrologic Instruments, Inc., Blackwood, NJ (US)

(72) Inventors: Gregory Mark Rueblinger, Stratford, NJ (US); Kai Wang, Suzhou (CN); Daniel J. Olson, Voorhees, NJ (US); Mikhail L. Veksland, Marlton, NJ (US)

(73) Assignee: Metrologic Instruments, Inc., Blackwood, NJ (US)

( * ) Notice: Subject to any disclaimer, the term of this patent is extended or adjusted under 35 U.S.C. 154(b) by 14 days.

This patent is subject to a terminal disclaimer.

(21) Appl. No.: 13/867,332

(22) Filed: Apr. 22, 2013

(65) Prior Publication Data

US 2013/0213785 A1 Aug. 22, 2013

Related U.S. Application Data (63) Continuation of application No. 12/421,076, filed on Apr. 9, 2009, now Pat. No. 8,424,768.

(51) Int. Cl.
*G06K 7/10* (2006.01)
*H01H 13/02* (2006.01)
*H01H 9/06* (2006.01)

(52) U.S. Cl.
CPC ........... *H01H 13/02* (2013.01); *G06K 7/10881* (2013.01); *H01H 9/06* (2013.01)

(58) Field of Classification Search
CPC ....... H01H 13/00; H01H 13/02; H01H 13/12; H01H 13/18; H01H 13/14; H01H 9/00; H01H 9/02; H01H 9/06; H05K 5/00; H05K 5/0004; G06K 7/10881
USPC .................. 235/454, 462.48, 462.01–462.49, 235/472.01–472.03; 382/313, 321; D14/420, 426–428, 430, 453; 358/473
See application file for complete search history.

(56) References Cited

U.S. PATENT DOCUMENTS

| | | | |
|---|---|---|---|
| 5,117,098 | A | 5/1992 | Swartz |
| 5,194,703 | A | 3/1993 | Deeg |
| 5,200,597 | A | 4/1993 | Eastman et al. |
| 5,471,042 | A | 11/1995 | Kirkeby et al. |
| 5,565,671 | A | 10/1996 | Kirkeby et al. |
| 5,576,531 | A | 11/1996 | Murphy |
| 5,675,138 | A | 10/1997 | La |
| 5,767,502 | A | 6/1998 | Ferland et al. |
| 5,907,147 | A | 5/1999 | La |

(Continued)

*Primary Examiner* — Thien M Le
*Assistant Examiner* — April Taylor
(74) *Attorney, Agent, or Firm* — Additon, Higgins & Pendleton, P.A.

(57) ABSTRACT

A trigger mechanism includes soft stops and an associated method activates a switch in a device or apparatus. The trigger mechanism includes a trigger receptacle, a trigger disposed in the trigger receptacle and movable between an un-actuated and an actuated position by a user depressing the trigger, and a soft stop comprised of at least one projection positioned to engage a resilient elastomeric insert. Moving the trigger from the un-actuated to actuated position compresses the elastomeric insert with the projection and activates the switch to provide a tactile sensation of the switch activation to the user. The switch may be an electric switch disposed in a hand held device, such as a barcode scanner in some embodiments.

17 Claims, 6 Drawing Sheets

(56) References Cited

U.S. PATENT DOCUMENTS

| | | |
|---|---|---|
| 6,158,662 A | 12/2000 | Kahn et al. |
| 6,357,659 B1 | 3/2002 | Kelly et al. |
| 6,652,941 B1 | 11/2003 | Chadwick et al. |
| 6,984,797 B2 | 1/2006 | Morita et al. |
| 6,984,799 B2 | 1/2006 | Kawaguchi et al. |
| 7,285,741 B2 | 10/2007 | Kato |
| 7,306,156 B2 | 12/2007 | Wulff et al. |
| 7,360,707 B2 | 4/2008 | Barkan et al. |
| 7,381,914 B1 | 6/2008 | Plesko et al. |
| 7,481,372 B2 | 1/2009 | Wulff et al. |
| 7,497,382 B2 | 3/2009 | Mitelman et al. |
| 7,673,804 B1 * | 3/2010 | Hinson et al. ............ 235/472.01 |
| 7,857,226 B2 | 12/2010 | Mangaroo et al. |
| 8,146,824 B2 | 4/2012 | Drzymala |
| 8,424,768 B2 * | 4/2013 | Rueblinger et al. ..... 235/462.48 |
| 2008/0116280 A1 | 5/2008 | Plesko et al. |
| 2008/0164318 A1 | 7/2008 | Wulff et al. |
| 2009/0108076 A1 | 4/2009 | Barkan et al. |
| 2009/0266897 A1 * | 10/2009 | Drzymala ................ 235/472.01 |

\* cited by examiner

TRIGGER MECHANISM FOR HAND HELD DEVICES

CROSS-REFERENCE TO PRIORITY APPLICATION

The present application is a continuation of U.S. patent application Ser. No. 12/421,076 for a Trigger Mechanism for Hand Held Devices, filed Apr. 9, 2009 (and published Oct. 14, 2010 as U.S. Patent Application Publication No. 2010/0258631), now U.S. Pat. No. 8,424,768. Each of the foregoing patent application, patent publication, and patent is hereby incorporated by reference in its entirety.

FIELD OF THE INVENTION

The present invention relates to an improved button or trigger actuation mechanism for activating a switch in an electrical or electronic device such as a barcode scanner in some embodiments.

BACKGROUND

Many hand held portable electrical and electronic devices, such as point-of-sale barcode readers or scanners, have one or more button or trigger actuators for activating one or more functions of the device. For example, in a hand held point-of-sale barcode scanner, a trigger actuator is provided for activating an electrical switch associated with a laser source such as a visible laser diode (VLD) to generate the laser beam that scans barcodes. These trigger actuators or actuation mechanisms may come in a variety of mechanical configurations and generally have a trigger or button that the user presses to activate the laser scan function. Although it is possible that the trigger be an integral part of the electrical switch that electrically activates the laser beam scanner, more often the button may be a separate structure that is directly or indirectly linked to the switch inside the hand held device. Often, the trigger is shaped to aesthetically blend in with the shape and appearance of the hand held device. In addition, the size of the trigger may be substantially enlarged in comparison to the actual electrical switch to provide a more robust and appropriately sized tactile trigger surface to accommodate a user's finger. The trigger may therefore be merely a mechanical linkage that transfers the external force exerted on the trigger by a user's finger directly to the switch located inside the hand held electrical or electronic device.

Conventional button or trigger mechanisms for hand held barcode scanners are often of a hinged design with the trigger being coupled to the scanner housing about a single pivot point. Hinged trigger mechanisms for scanners are traditionally formed of molded hard plastic. To establish the pivot point, pivotable hinged triggers often require special intricate molded and/or machined features to be incorporated into the scanner housing and corresponding portions of the trigger mechanism. Such conventional hinged trigger designs, however, have drawbacks. First, the trigger design may become mechanically complex sometimes requiring extra components such as metal pins to form the hinged pivot in addition to requiring intricate molded and/or machines features. These factors translate into higher manufacturing costs for the barcode scanners or readers. Second, the intricate trigger hinges sometimes are not sufficiently robust enough to withstand heavy commercial and industrial usage without trigger malfunctions or breakage. Third, the single hinged pivot point often lacks a smooth tactile feel when the user depresses the trigger because the amount of finger pressure required to fully actuate the trigger and corresponding electrical switch associated with the trigger varies as the distance from the trigger pivot point increases. Therefore, the finger pressure may vary depending on where on the trigger face or surface the user presses. Traditional hinged trigger designs also typically lack a tactilely "soft" feel because trigger travel limit stops are sometimes formed by only hard surfaces on the trigger coming into abutting contact with corresponding hard surfaces on the scanner housing and/or trigger receptacle.

An improved button or trigger mechanism is desired.

SUMMARY

The present invention provides a button or trigger mechanism for activating an electrical switch in a hand held electrical or electronic device. In some embodiments, the electrical or electronic device may be a portable barcode reader or scanner.

In one embodiment, a trigger mechanism according to the present invention is a free-floating trigger design that incorporates a combination of soft and hard travel stops to advantageously provide a smooth acting trigger with improved tactile feel for the user. In some preferred embodiments, the soft stops may be formed by incorporating resilient and compressible elastomeric or rubber stops into the trigger. In one embodiment, the soft stops may advantageously be co-molded with hard plastic portions of the trigger to provide the soft tactile feel and smooth trigger pull operation, in addition to reducing noise between hard stop plastic surfaces on the trigger and trigger receptacle.

The free floating trigger according to the present invention also provides variable trigger resistance to applied finger pressure from the user to enhance tactile feel in contrast to conventional trigger designs with typically a hard on/off actuation feel. In some embodiments, the resistance returned to the user by depressing the trigger increases as the trigger travel reaches a maximum limit wherein the hard stops on the trigger and trigger receptacle mutually engage each other. Concomitantly, the speed of the trigger pull slows as the trigger travel reaches the maximum limit.

The free floating trigger according to the present invention preferably is hinge-less and mechanically simple, which is intended to improve reliability and lower manufacturing costs in contrast to conventional intricate hinged trigger or button designs. In addition, the free floating trigger may be actuated from virtually any point on the face or surface of the trigger by the user with substantially an equal tactile feel.

According to one embodiment, a trigger mechanism for activating a switch in an electric or electronic device includes: a trigger receptacle including a compressible insert; a trigger movably disposed in the trigger receptacle and movable between an un-actuated and an actuated position by a user depressing the trigger. The trigger has a projection positioned to engage the compressible insert, wherein depressing the trigger engages the projection with the compressible insert and activates the switch to provide a tactile sensation of the switch activation to the user. In one embodiment, the compressible insert is made of an elastomeric material. The compressible insert may be co-molded with the trigger receptacle which is preferably made of molded rigid plastic. The projection is formed of a rigid material, and in some embodiments is molded as an integral part of the trigger. In other embodiments, the trigger includes a plurality of rigid projections which each engage a compressible insert or portions of a compressible insert. In some embodiments, the trigger further includes a hard stop surface positioned to engage a corresponding hard stop surface disposed on the trigger receptacle which form a hard stop that limits the maximum range of travel of the trigger in the trigger receptacle.

According to another embodiment, a trigger mechanism with soft stop for activating an electrical switch includes: a trigger receptacle; a trigger disposed in the trigger receptacle and movable between an un-actuated and an actuated position by a user depressing the trigger; and a soft stop comprised of at least one projection positioned to engage a resilient elastomeric insert. Moving the trigger from the un-actuated to actuated position compresses the elastomeric insert with the projection and activates the switch to provide a tactile sensation of the switch activation to the user. In a preferred embodiment, the projection is formed of a rigid material such as hard plastic. In one embodiment, the trigger and trigger receptacle are made of rigid molded plastic, and the elastomeric insert is co-molded with either the trigger or trigger receptacle.

According to another embodiment, a hand held device with trigger mechanism includes: a housing; an electrical switch disposed in the housing; and a trigger mechanism comprising a trigger receptacle and a trigger movably disposed in the receptacle, the trigger having a soft stop comprised of at least one rigid projection positioned to engage an elastomeric insert. When a user depresses the trigger to actuate the trigger mechanism, the projection compresses the elastomeric insert and activates the switch to provide a tactile sensation of the switch activation to the user.

A method for activating a switch in a hand held device is provided. The method includes: providing a trigger mechanism having a movable trigger slidably disposed in a stationary trigger receptacle mounted in the hand held device; depressing the trigger; compressing an elastomeric insert with a corresponding rigid projection disposed in the trigger mechanism; and activating a switch in the device via the trigger to operate a function of the device. The method may further include mutually engaging a pair of opposing hard stop surfaces disposed in the trigger mechanism in response to depressing the trigger. In another embodiment, the method may further include compressing an elastomeric biasing member acting on the trigger in response to depressing the trigger. The biasing member may engage a stem projecting rearwards from the trigger and may be disposed in a socket formed in the trigger receptacle that is configured to receive the stem. In one embodiment, the elastomeric biasing member may be a return force diaphragm that may seal the trigger mechanism from the interior of the hand held device. In one embodiment, the hand held device is a barcode reader or scanner.

BRIEF DESCRIPTION OF THE DRAWINGS

The features of the preferred embodiments will be described with reference to the following drawings where like elements are labeled similarly, and in which.

All drawings are schematic and are not drawn to scale.

DETAILED DESCRIPTION

This description of illustrative embodiments according to principles of the present invention is intended to be read in connection with the accompanying drawings, which are to be considered part of the entire written description. In the description of embodiments of the invention disclosed herein, any reference to direction or orientation is merely intended for convenience of description and is not intended in any way to limit the scope of the present invention. Relative terms such as "lower," "upper," "horizontal," "vertical,", "above," "below," "up," "down," "top" and "bottom" as well as derivatives thereof (e.g., "horizontally," "downwardly," "upwardly," etc.) should be construed to refer to the orientation as then described or as shown in the drawing under discussion. These relative terms are for convenience of description only and do not require that the apparatus be constructed or operated in a particular orientation. Terms such as "attached," "affixed," "connected" and "interconnected," refer to a relationship wherein structures are secured or attached to one another either directly or indirectly through intervening structures, as well as both movable or rigid attachments or relationships, unless expressly described otherwise. Moreover, the features and benefits of the invention are illustrated by reference to the preferred embodiments. Accordingly, the invention expressly should not be limited to such preferred embodiments illustrating some possible non-limiting combination of features that may exist alone or in other combinations of features; the scope of the invention being defined by the claims appended hereto.

As the terms are used herein, "elastomer" and "elastomeric" mean a material having the property of elasticity and includes synthetic or naturally-occurring materials and compounds including rubber.

One possible embodiment of a trigger assembly or mechanism 20 according to principles of the present invention will now be described with non-limiting reference to a handheld barcode laser scanner 10 shown in FIG. 1. It will be appreciated, however, that the trigger may be used with any type of hand held scanner or any other electronic or electrical device or apparatus requiring a means for actuating a function of the device.

Figure 1:
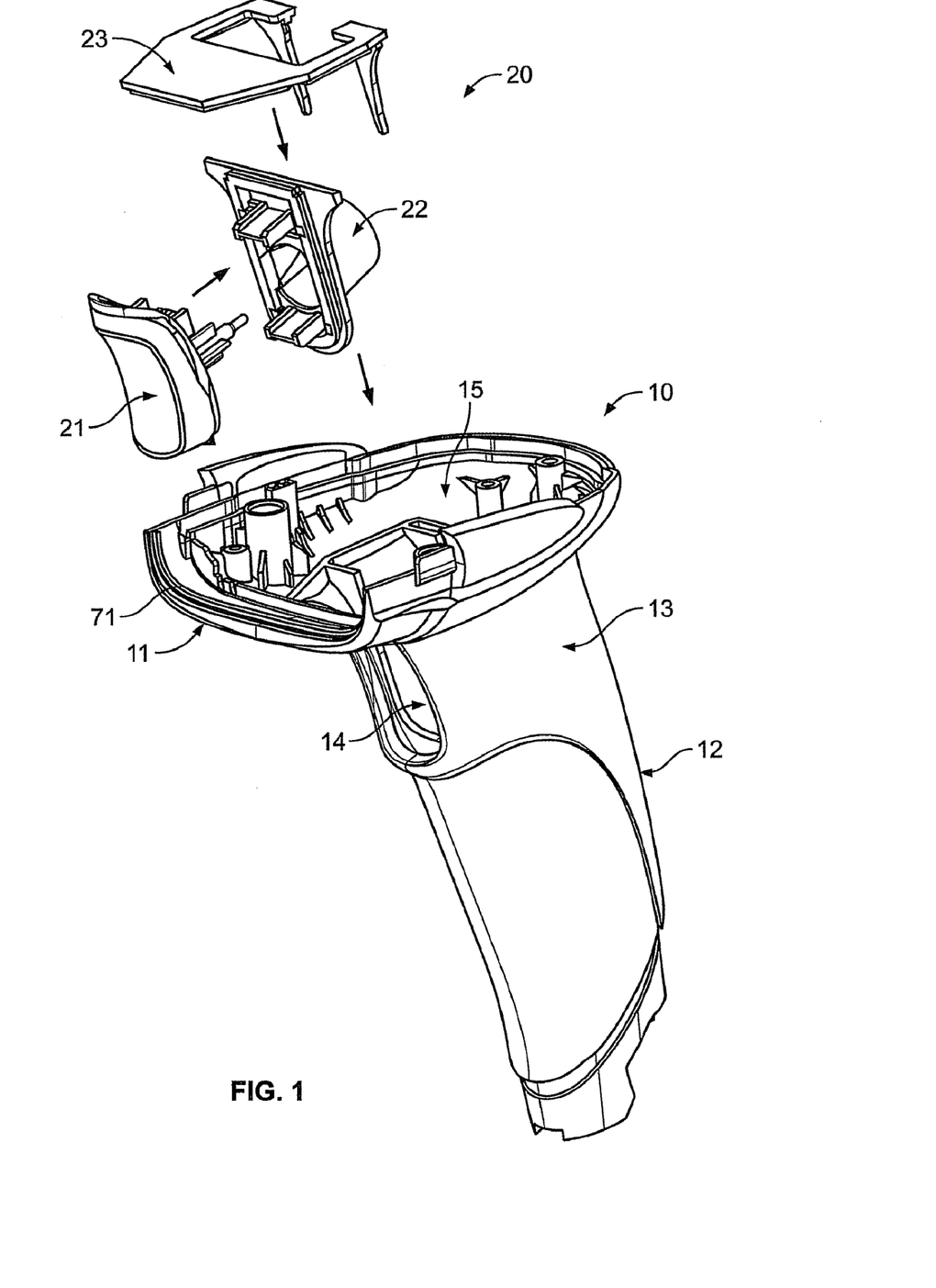
FIG. 1 is an exploded perspective view of a barcode scanner and trigger mechanism according to an embodiment of the present invention.

FIG. 1 shows scanner 10 with the top removed and trigger mechanism 20 in an exploded view disembodied from the scanner. Referring now to FIG. 1, a portable handheld scanner 10 in one possible embodiment includes a housing 13 having an upper portion 11 and a lower handle portion 12 for holding the scanner. Housing 13 defines an internal cavity 15 extending through upper and lower portions 11, 12 that is configured and adapted to receive and support trigger mechanism 20. Upper portion 11 houses inside a conventional main printed circuit board (PCB) (not shown) which incorporates an optical bench and the main scanning system electronics including a conventional laser source (these components not shown for clarity).

Lower handle portion 12 defines a trigger opening 14 for projecting at least a portion of a trigger 21 therethrough so that a user may access the trigger mechanism. With additional reference to FIG. 6, handle portion 12 further includes an interface PCB 30 with an electrical switch 31 which is activated by a user via trigger mechanism 20 mounted in housing 13. In one embodiment, electrical switch 31 is electrically coupled to the laser source disposed in housing 13.

Figure 2:
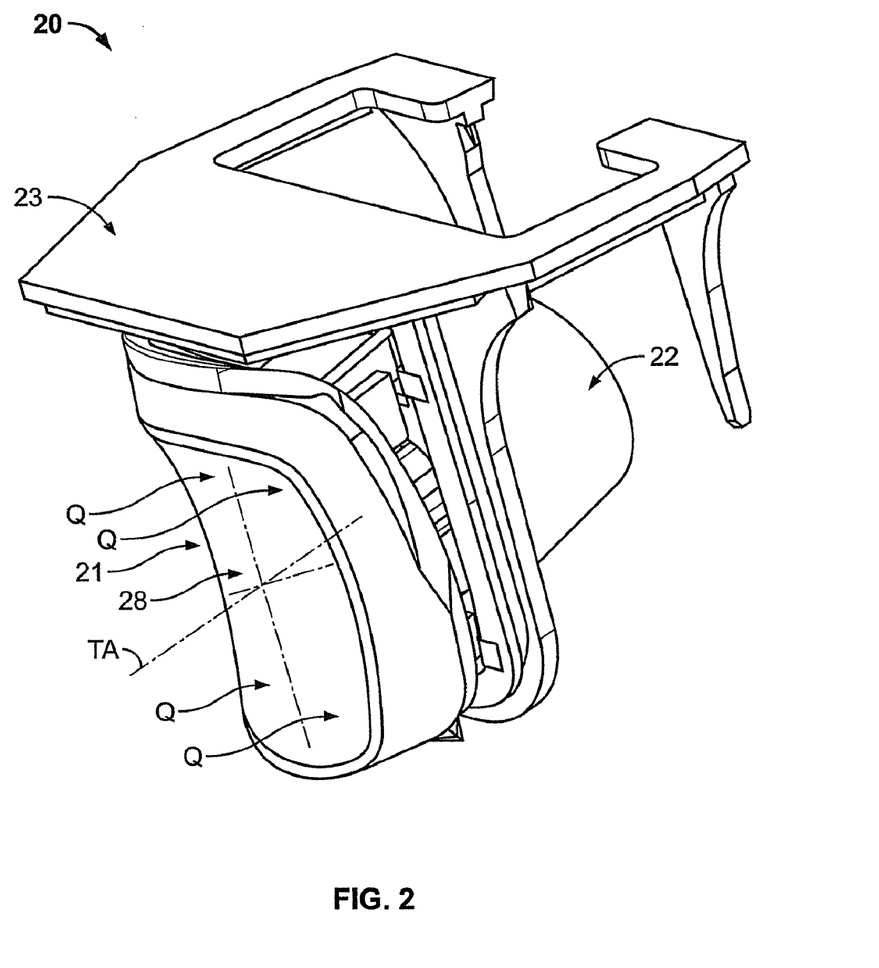
FIG. 2 is a perspective view of the assembled trigger mechanism of FIG. 1.
Figure 5:
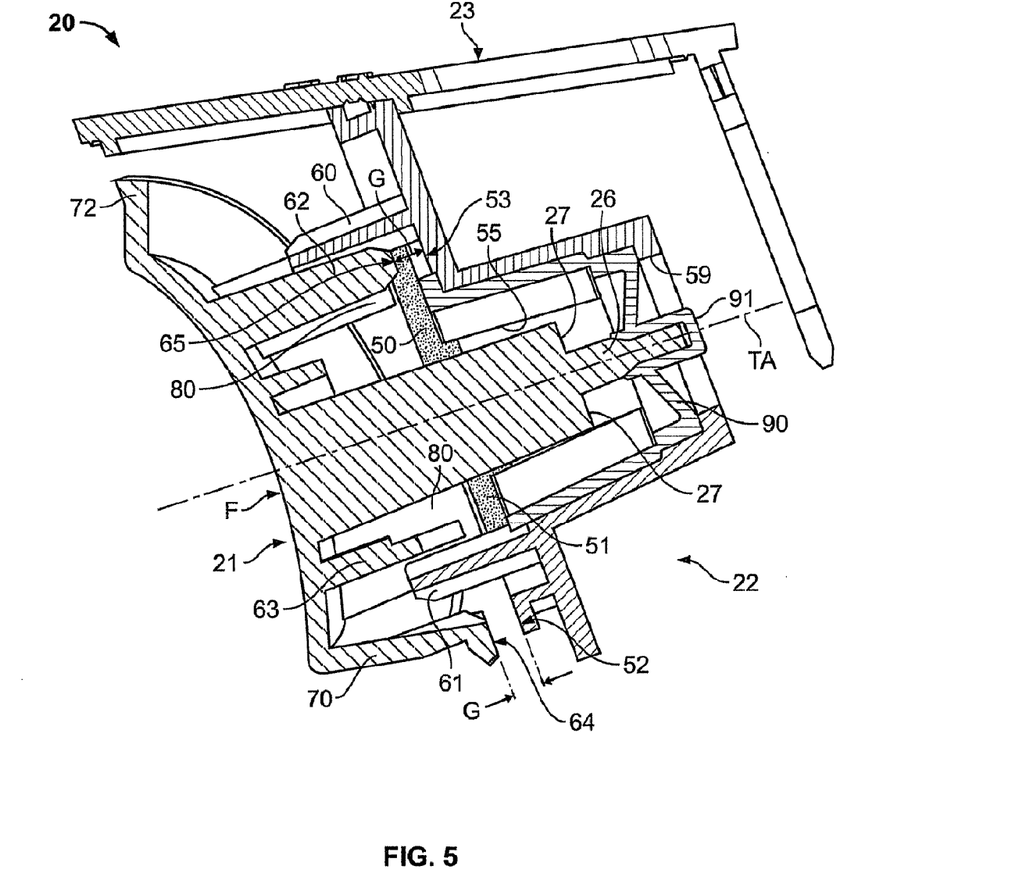
FIG. 5 is a cross-sectional side view of the assembled trigger mechanism of FIG. 1.
Figure 6:
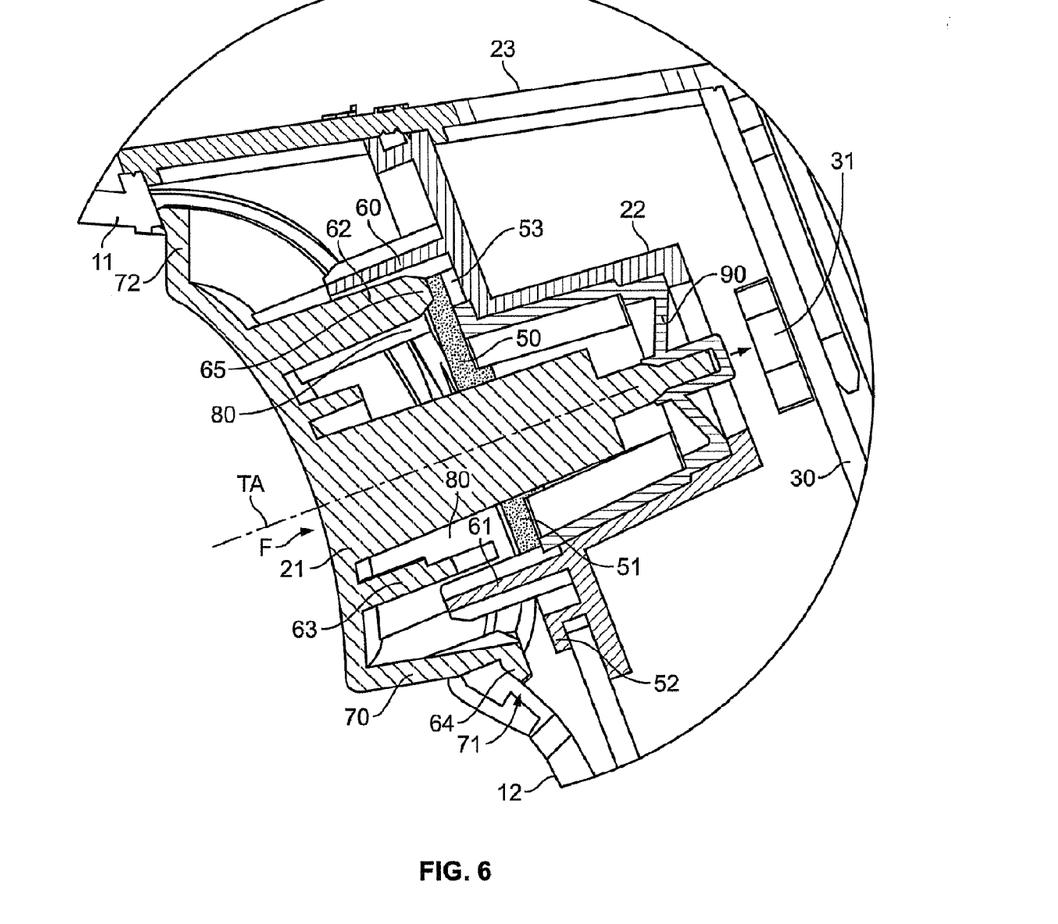
FIG. 6 is a cross-sectional side view of the assembled trigger mechanism of FIG. 1 disposed in a portion of barcode scanner of FIG. 1.

With continuing reference to FIGS. 1 and 6, trigger mechanism 20 generally includes a trigger 21 which is slidably received in trigger capture or receptacle 22 for axial movement and travel therein along a trigger axis TA (see also FIGS. 2 and 5). Trigger axis TA, as shown in FIG. 5, defines a line of action for trigger mechanism 20. Trigger mechanism 20 is preferably positioned and mounted in handle portion 12 proximate trigger switch 31 such that when a user depresses trigger 21, the trigger mechanism is able to contact an electrical switch 31 in a manner further described herein. Trigger mechanism 20 further includes a trigger cover 23 which engages trigger receptacle 22 and assists with retaining and aligning trigger mechanism 20 within scanner housing 13 in proper position and orientation (see also FIG. 5). Trigger cover 23 may be suitably configured to interlock with trigger receptacle 22 and housing 13 as required to assist with retaining and isolating trigger mechanism 20 securely in the housing.

Figure 3:
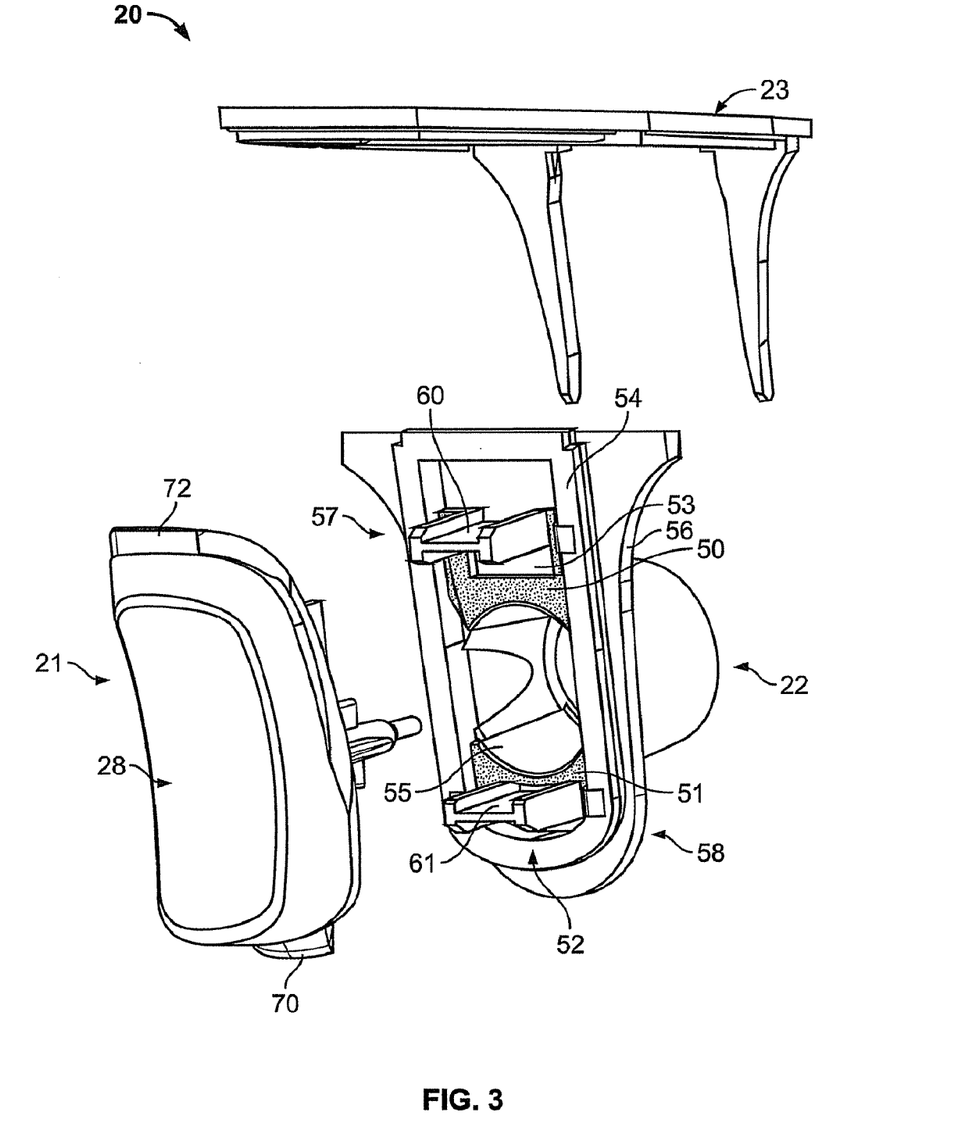
FIG. 3 is an exploded front perspective view of the trigger mechanism of FIG. 1.

FIGS. 2-6 show various assembled and exploded views and details of trigger mechanism 20. Referring now primarily to FIGS. 3 and 5, trigger receptacle 22 in one possible embodiment includes a front portion 57, a rear portion 58, and a flange 56 disposed therebetween and extending radially outwards from the trigger receptacle as shown. Flange 56 incorporates a raised face 52 extending outwards from the flange in an axial direction along trigger axis TA. In one embodiment, a lower portion of raised face 52 defines a hard stop surface 52 for abutting contact with a complementary-configured corresponding hard stop surface 64 disposed on trigger 21 as further described herein. Accordingly, hard stop surface 52 preferably faces towards trigger 21 when the trigger mechanism 20 is fully assembled. Hard stop surfaces 52 and 64 together define a first hard stop for trigger mechanism 20.

Figure 4:
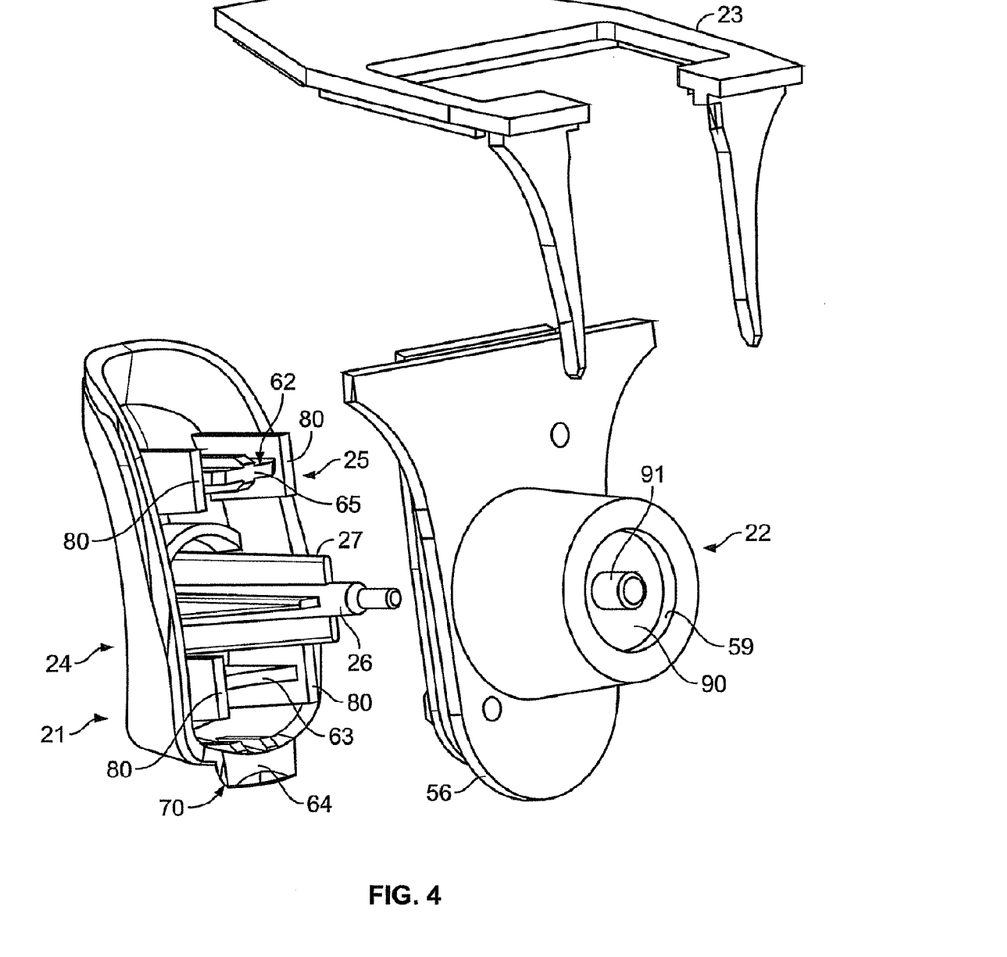
FIG. 4 is an exploded rear perspective view of the trigger mechanism of FIG. 1.

With primary reference to FIGS. 3 and 5, trigger receptacle 22 further includes a socket 55 extending rearwards from rear portion 58 of the receptacle. Socket 55 is configured and adapted to receive at least part of a trigger stem 26 formed or attached to trigger 21 (see FIG. 4). In one embodiment, socket 55 defines a rear aperture 59 as best shown in FIG. 4 to allow trigger stem 26 to emerge therefrom when a user presses inwards with force F on trigger 21. This allows stem 26 to contact electrical switch 30 for activating the scanning laser.

Trigger receptacle 22 further includes a pair of spaced apart trigger receptacle guides 60, 61 as shown in FIGS. 3, 5, and 6. Guides 60, 61 project axially forward from front portion 57 of trigger receptacle 22 and face towards trigger 21 in one embodiment to slidably receive a pair of mating trigger guides 62, 63 formed on or attached to trigger 21. In one possible embodiment as best shown in FIGS. 5 and 6, trigger guide 63 may be slidably received above trigger receptacle guide 61, and trigger guide 62 may be slidably received below trigger receptacle guide 60. This guide arrangement limits the vertical movement of trigger 21 in trigger receptacle 22 to help maintain proper alignment of trigger in the trigger receptacle during actuating of the trigger mechanism 20 and to support for the trigger. In one possible embodiment, trigger receptacle guides 60, 61 may have a generally H-shaped cross-section as best shown in FIG. 3. Any suitable cross-sectional shape may be used however. Preferably one trigger receptacle guide 60, 61 is disposed on each side of socket 55.

Trigger receptacle 22 and its foregoing appurtenances are preferably made of a hard substantially rigid and inelastic material, such as a hard plastic in one non-limiting embodiment. In some further examples, trigger receptacle 22 may be made of any suitable thermosetting plastic or sufficiently rigid thermoplastic, fiber-reinforced plastic, composites, metal, etc. Trigger receptacle 22 may be a molded part in a preferred embodiment and formed by a conventional molding process such as injection, compression, or transfer molding, etc., or formed by any other suitable method conventionally used in the art for fabricating such parts depending on the material and configuration of the component to be made.

Referring primarily now to FIGS. 3 and 4, trigger 21 includes a front portion 24 and a rear portion 25. Front portion 24 defines a finger surface 28 which preferably is ergonomically contoured to receive a finger from a user for actuating the trigger mechanism 20. Rear portion 25 of trigger 21 includes trigger stem 26 and trigger guides 62, 63 projecting axially rearwards therefrom and facing towards trigger receptacle 22. Trigger stem 26 may include radially projecting ribs 27 along at least a substantial part of the length of the stem. Ribs 27 help support and structurally strengthen trigger stem 26 and assist with centering the stem in socket 55 in trigger receptacle 22 (best shown in FIG. 5) during actuation of the trigger.

In one embodiment, referring to FIGS. 4-6, trigger guides 62, 63 may be generally flat rectangular shaped structures having a greater width than height. Other suitable configurations for trigger guides 62, 63 may be used so long as the shape selected is compatible with the configuration selected for trigger receptacle guides 60, 61 to allow for smooth sliding movement between the four guides. In one embodiment, trigger guides 62, 63 are preferably spaced apart, and more preferably one guide is disposed on each side of trigger stem 26 as shown to stabilize movement of the stem in trigger receptacle socket 55.

Referring to FIGS. 4 and 5, in one embodiment, trigger guide 62 defines a hard stop surface 65 for abutting contact with a complementary corresponding hard stop surface 53 disposed on trigger receptacle 22 (see FIG. 3). In a preferred embodiment, hard stop surface 65 is disposed on a free end of trigger guide 62. Accordingly, hard stop surface 65 preferably faces towards trigger receptacle 22 when the trigger mechanism 20 is fully assembled. Hard stop surfaces 65 and 53 together define a second hard stop for trigger mechanism 20. The first and second hard stops define the maximum travel limit of trigger 21 in trigger receptacle 22.

Referring to FIGS. 3-6, trigger 21 may further include a flexible cantilevered retaining clip 70 to preferably secure the trigger to scanner housing 13, and more preferably to lower portion 12 of the housing. Clip 70 engages a lip 71 formed in housing 13 as shown in FIG. 6 such that the trigger 21 will be movably retained in the housing when the trigger mechanism 20 is actuated by a user depressing the trigger. Accordingly, clip 70 is axially movable with respect to scanner housing 13 and trigger receptacle 22 which preferably remains stationary and fixed in the housing when the trigger 21 is depressed by a user. Trigger 21 may further include an upper ridge 72 as best shown in FIGS. 3 and 6 which engages an edge 11 formed in upper portion 11 of scanner housing 13 to retain the upper portion of trigger 21 in the housing. Trigger mechanism 20 is therefore "free floating" as no hinged attachment is used.

In one embodiment, referring to FIGS. 4-6, a portion of retaining clip 70 defines hard stop surface 64 for abutting contact with a complementary-configured corresponding hard stop surface 52 disposed on trigger receptacle 22 as shown in FIG. 3. Accordingly, hard stop surface 64 preferably faces towards trigger receptacle 22 when the trigger mechanism 20 is fully assembled. As already described elsewhere herein, hard stop surfaces 52 and 64 together define the first hard stop for trigger mechanism 20.

Trigger 21 and its foregoing appurtenances are preferably made of a hard substantially rigid and inelastic material, such as a hard plastic in one non-limiting embodiment. In some further examples, trigger 21 may be made of any suitable thermosetting plastic or sufficiently rigid thermoplastic, fiber-reinforced plastic, composites, metal, etc. Trigger 21 may be a molded part in a preferred embodiment and formed by a conventional molding process such as injection, compression, or transfer molding, etc., or formed by any other suitable method conventionally used in the art for fabricating such parts depending on the material and configuration of the component to be made.

According to one aspect of the present invention, a soft stop is provided for free floating trigger mechanism 20 that provides a cushioned and smooth tactile feel to the user when the trigger 21 is depressed and trigger stem 26 directly or indirectly engages electrical switch 31. Referring to FIGS. 3-6, in one embodiment, a soft stop may be formed by a plurality of preferably rigid blade-shaped projections 80 extending rearwards from rear portion 25 of trigger 21 that are configured and adapted to engage corresponding resilient or compressible inserts 50, 51 disposed on forward-facing front portion 57 of trigger receptacle 22. In some embodiments, at least one projection 80 and one corresponding compressible insert 50 or 51 are provided. In one possible preferred embodiment shown in the figures, four soft stop projections 80 are provided that are preferably spaced apart side-to-side and top-to-bottom on trigger 21. Preferably, at least one projection is provided for and associated with each of four quadrants Q defined on finger surface 28 of trigger 21 (see FIG. 2). Such a distribution of projections 80 ensures that when a user applies a pressing force F to any quadrant on finger surface 28 offset from trigger axis TA, a tactilely soft cushioned feel will still be imparted to the user when the trigger is depressed (see, e.g. FIG. 5). Preferably, at least one soft stop projection 80 is provided above and below trigger stem 26 and more preferably two projections 80 are provided above and below the trigger stem in a preferred embodiment as shown.

Soft stop projections 80 are preferably made of a hard substantially rigid and inelastic material, such as a hard plastic in one non-limiting embodiment. In some further examples, projections 80 may be made of any suitable thermosetting plastic or sufficiently rigid thermoplastic, fiber-reinforced plastic, composites, metal, etc. Projections 80 may be a molded part in a preferred embodiment and formed by a conventional molding process such as injection, compression, or transfer molding, etc., or formed by any other suitable method conventionally used in the art for fabricating such parts depending on the material and configuration of the component to be made. Preferably, projections 80 are formed molded as an integral part of trigger 21 and are therefore made of the same material as the trigger. In other embodiments, projections 80 may be separate components that are attached to trigger 21 by any suitable method commonly used in the art such as mechanical interlocking engagement, press fitting, adhesives, etc.

With continuing reference to FIGS. 3-6, soft stop inserts 50, 51 disposed on a forward-facing front portion 57 of trigger receptacle 22 are preferably formed of a resilient elastomeric compressible material, such as without limitation an elastomeric polymer or rubber (natural or synthetic) that possesses properties of sufficient elasticity or resiliency to perform the functions described herein. Soft stop inserts 50, 51 preferably have an elastic memory and will return to their original pre-compressed configuration upon removing the force or pressure applied by hard projections 80. Soft stop inserts 50, 51 are disposed at predetermined locations and may have a suitable size and configuration such that each projection 80 is aligned to contact and compressibly engage a corresponding soft stop insert 50, 51 or at least a portion thereof when trigger 21 is depressed inward by a user. In one embodiment, one lower insert 51 may be disposed below socket 55 and one upper insert 50 may be disposed above socket 55. In the embodiment shown, upper insert 50 may have a cutout disposed below trigger receptacle guides 60 so that hard stop surface 65 on trigger 21 may access and engage corresponding hard stop surface 53 disposed on trigger receptacle 22. In other embodiments, four separate compressible soft stop inserts may provided such that each projection 80 has its own corresponding insert (not shown).

Compressible soft stop inserts 50, 51 may be formed or attached to trigger receptacle 22 in any suitable manner. In a preferred embodiment, a conventional co-molding process may be used such that inserts 50, 51 are co-molded with the hard plastic portions of trigger receptacle 22 when the receptacle is injection molded. The co-molding process is an efficient and cost-effective manner of incorporating compressible inserts 50, 51 into the trigger receptacle 22 and provides good adhesion between the co-molded components. In other embodiments, inserts 50, 51 may be attached to trigger receptacle 22 by adhesives or mechanical means such as interlocking features on the inserts and trigger receptacle.

It will be appreciated that trigger mechanism 20 may include any suitable number, arrangement, and configuration of rigid projections 80 and compressible inserts 50, 51 so long as at least one pair of a projection and an insert are provided to form at least one soft stop.

Referring to FIGS. 5 and 6, a biasing member is provided to urge trigger 21 forward toward a neutral or un-actuated position as shown in these figures wherein trigger stem 26 does not engage electrical switch 31 sufficiently to activate the switch. The biasing member assists with returning trigger 21 fully forward after a user fully depresses the trigger to activate the scanner and electrical switch 31. In one embodiment, the biasing member may be a return force diaphragm 90 as shown which preferably acts on trigger 21, and in one embodiment as shown acts on the trigger stem 26 of the trigger. FIGS. 5 and 6 show return force diaphragm 90 in an uncompressed state. Return force diaphragm 90 may include a cupped portion 91 configured to capture the free end of trigger stem 26. As shown in FIG. 4, cupped portion 91 may be axially projected through rear aperture 59 of trigger receptacle 22 to contact electrical switch 31 when the trigger mechanism is actuated by a user. In one embodiment, return force diaphragm 90 may be cup-shaped and seals the trigger mechanism 20 from the interior of scanner housing 13 to prevent external contaminants from entering scanner 10 through the trigger mechanism.

In a preferred embodiment, return force diaphragm 90 may be made of a flexible material such as an elastomeric or rubber which may be co-molded into trigger receptacle 22. Return force diaphragm 90 preferably has an elastic memory and will return to its original uncompressed configuration upon removing the finger pressure or force F applied to the diaphragm via trigger 21 and stem 26.

In other embodiments where sealing trigger mechanism 20 may not be desirable and/or needed, a conventional spring of any suitable type and material (e.g. helical, conical, or leaf steel springs, etc.) may be substituted for return force diaphragm 90 to serve as the biasing member for maintaining trigger 21 forward in an un-actuated position as shown in FIGS. 5 and 6 when the trigger is not depressed inward by a user. Such conventional springs would function similarly to return force diaphragm 90. Accordingly, it will be appreciated that any suitable material or configuration of a biasing member may be used with trigger mechanism 20 depending on the application requirements so long as trigger 21 may be biased fully forwarded toward an un-actuated or neutral position.

Operation of the trigger mechanism 20 will now be described with reference to FIGS. 2-6. In one embodiment, trigger mechanism 20 may be deployed in a barcode scanner 10 and is used to activate a laser source for a laser scanner or image capture for reader-type optical barcode scanners. FIGS. 5 and 6 show trigger mechanism 20 fully assembled and in a first "off" operating position with trigger 21 in a fully forward neutral or un-actuated position prior to be depressed by a user. Trigger 21 is biased into the un-actuated position by a biasing member such as return force diaphragm 90 disposed in trigger receptacle 22 as described elsewhere herein.

Soft stop projections 80 on trigger 21 and corresponding compressible soft stop inserts 50, 51 on trigger receptacle 22 are all positioned when trigger mechanism 20 is fully assembled and un-actuated as shown in FIGS. 5 and 6 such that projections 80 lightly contact or are slightly spaced apart from inserts 50. These items form a "soft stop" as more fully described elsewhere herein. For the "hard stops" as fully described elsewhere herein, hard stop surface 64 on retaining clip 70 is axially spaced apart from corresponding hard stop surface 52 disposed on trigger receptacle 22 by a gap "G" as best shown in FIG. 5. Similarly, hard stop surface 65 formed on trigger guide 62 is axially spaced apart from corresponding hard stop surface 53 disposed on trigger receptacle 22 by a gap G. The distance between hard stop surfaces 65 and 53 defined by gap G, and similarly between hard stop surfaces 64 and 52, defines a maximum range of travel for trigger 21 with respect to trigger receptacle 22 when a user depresses the trigger by applying an inward axial force F.

Referring to FIGS. 5 and 6, to initiate a barcode scan, the user actuates trigger mechanism 20 by applying an inward force F to finger surface 28 on trigger 21 that acts generally in the direction of the trigger axis TA. Trigger stem 26 will move rearwards in socket 55 towards electrical switch 31 with the free end of the stem approaching the switch. Simultaneously, soft stop projections 80 on trigger 21 will gradually compress soft stop inserts 50, 51 on trigger receptacle 22. Hard stop surface 65 will move rearward towards hard stop surface 53 and similarly hard stop surface 64 will move rearward towards hard stop surface 52, concomitantly decreasing gap G between each upper and lower hard stop. Preferably, the axial thickness of compressible inserts 50, 51 (measured parallel to the trigger axis TA) is selected such that the inserts will become fully or almost fully compressed at the same time that hard surfaces 65, 53 and 64, 52 abuttingly contact or engage each other respectively to provide a tactile sensation of the engagement of trigger stem 26 with electrical switch 31 or switch activation. Preferably, the size of gap G for each upper and lower hard stop is selected such that electrical switch 31 is fully activated by stem 26 when rearward travel of trigger 21 is stopped by mutual engagement of hard surfaces 65, 53 and 64, 52. This arrangement prevents overextension of trigger stem 26 onto switch 31 to prevent damage to the switch that might be caused by an excessive force F applied to trigger 21 by the user.

It should be noted that depressing trigger 21 will compress return force diaphragm 90 which will reach a fully compressed state when trigger stem 26 fully engages and contacts electrical switch 31. After the user releases trigger 21, return force diaphragm 90 will return to its uncompressed state shown in FIGS. 5 and 6 thereby simultaneously returning trigger 21 to its un-actuated position also shown in these figures. The scanner 10 is now readied to begin another scan.

Because trigger mechanism 20 is a free floating design, the finger pressure required to actuate the trigger mechanism should be substantially the same whether force F is applied directly on trigger 21 opposite stem 26 or generally in any quadrant Q. In conjunction with the soft stops provided according to the present invention, as described herein, trigger mechanism 20 provides an improved trigger response and tactile feel to the user compared to convention trigger designs. Trigger mechanism 20 further eliminates or at least dampens the undesired noise between trigger and receptacle attributable to conventional meshing hard surfaces in conventional trigger designs which lack soft stops.

In other embodiments of trigger mechanism 20 contemplated, a reverse arrangement of rigid soft stop projections 80 and corresponding compressible inserts 50, 51 may be used. For example, the rigid soft stop projections 80 or similarly functioning elements may alternatively be disposed on trigger receptacle 22 and compressible soft stop inserts 50, 51 or similarly functioning elements may be disposed on trigger 21.

Although the preferred embodiments have been described with reference to exemplary handheld barcode scanners, it will be appreciated by those skilled in the art that the improved trigger mechanism and method of operation described herein may be used with equal benefit for other types of electronic or electrical devices having electrical switches that require activation, such as without limitation in some representative examples electric power tools or appliances, laser and radar speed tracking guns, etc. Accordingly, the invention is not limited to use with barcode scanners alone.

While the foregoing description and drawings represent preferred or exemplary embodiments of the present invention, it will be understood that various additions, modifications and substitutions may be made therein without departing from the spirit and scope of the present invention as defined in the accompanying claims. In particular, it will be clear to those skilled in the art that the present invention may be embodied in other specific forms, structures, arrangements, proportions, sizes, and with other elements, materials, and components, without departing from the spirit or essential characteristics thereof, which may be particularly adapted to specific environments and operative requirements without departing from the principles of the present invention. The presently disclosed embodiments are therefore to be considered in all respects as illustrative and not restrictive, the scope of the invention being defined by the appended claims, and not limited to the foregoing description or embodiments. Rather, the appended claims should be construed broadly, to include other variants and embodiments of the invention, which may be made by those skilled in the art without departing from the scope and range of equivalents of the invention.

The invention claimed is:

1. A trigger mechanism for a device having a switch, comprising:
    a trigger receptacle within the device, the trigger receptacle having a trigger axis and comprising a soft stop insert;
    a free floating trigger positioned within the trigger receptacle for moving along the trigger axis and engaging the device's switch, the trigger comprising a soft stop projection positioned on the trigger to engage the trigger receptacle's soft stop insert; and
    a biasing member positioned between the trigger receptacle and the trigger for urging the trigger away from the device's switch when the trigger mechanism is not activated by a user;
    wherein the trigger receptacle and the biasing member constrain the trigger's motion to movements along the trigger axis;
    wherein the trigger receptacle comprises a hard stop surface; and wherein the trigger comprises a hard stop surface positioned to engage the trigger receptacle's hard stop surface to limit the range along the trigger axis that the trigger travels when depressed.

2. The trigger mechanism of claim 1, wherein the biasing member is made of an elastomeric material.

3. The trigger mechanism of claim 1, wherein the biasing member is co-molded with the trigger receptacle.

4. The trigger mechanism of claim 1, wherein the trigger receptacle is made of molded rigid plastic and the soft stop insert is co-molded with the trigger receptacle.

5. The trigger mechanism of claim 1, wherein:
the trigger receptacle comprises a guide; and
the trigger comprises a guide that slidably mates with the trigger receptacle's guide to guide movement of the trigger along the trigger axis within the trigger receptacle.

6. A trigger mechanism for a device having a switch, comprising:
a trigger receptacle within the device, the trigger receptacle having a trigger axis;
a free floating trigger positioned within the trigger receptacle for moving along the trigger axis and engaging the device's switch;
a biasing member positioned between the trigger receptacle and the trigger and between the trigger and the device's switch for urging the trigger away from the device's switch when the trigger mechanism is not activated by a user and for sealing the trigger mechanism from the interior of the device; and
a compressible insert positioned between the trigger receptacle and the trigger;
wherein the trigger receptacle and the biasing member constrain the trigger's motion to movements along the trigger axis.

7. The trigger mechanism of claim 6, wherein the biasing member is made of an elastomeric material.

8. The trigger mechanism of claim 6, wherein the trigger comprises a projection positioned on the trigger to engage the compressible insert when the trigger is depressed.

9. The trigger mechanism of claim 6, wherein:
the trigger receptacle comprises a hard stop surface; and
the trigger comprises a hard stop surface positioned to engage the trigger receptacle's hard stop surface, thereby limiting the range along the trigger axis that the trigger travels when depressed.

10. The trigger mechanism of claim 6, wherein:
the trigger receptacle comprises a guide; and
the trigger comprises a guide that slidably mates with the trigger receptacle's guide to guide movement of the trigger along the trigger axis within the trigger receptacle.

11. A trigger mechanism for a device having a switch, comprising:
a trigger receptacle within the device, the trigger receptacle having a trigger axis;
a free floating trigger positioned within the trigger receptacle for moving along the trigger axis and engaging the device's switch;
a biasing member positioned between the trigger and the device's switch for sealing the trigger mechanism from the interior of the device; and
a compressible insert positioned between the trigger receptacle and the trigger;
wherein the trigger receptacle and the biasing member constrain the trigger's motion to movements along the trigger axis.

12. The trigger mechanism of claim 11, wherein the biasing member is made of an elastomeric material.

13. The trigger mechanism of claim 11, wherein the biasing member is co-molded with the trigger receptacle.

14. The trigger mechanism of claim 11, wherein the trigger receptacle is made of molded rigid plastic and the compressible insert is co-molded with the trigger receptacle.

15. The trigger mechanism of claim 11, wherein the trigger comprises a projection positioned on the trigger to engage the compressible insert when the trigger is depressed.

16. The trigger mechanism of claim 11, wherein:
the trigger receptacle comprises a hard stop surface; and
the trigger comprises a hard stop surface positioned to engage the trigger receptacle's hard stop surface, thereby limiting the range along the trigger axis that the trigger travels when depressed.

17. The trigger mechanism of claim 11, wherein:
the trigger receptacle comprises a guide; and
the trigger comprises a guide that slidably mates with the trigger receptacle's guide to guide movement of the trigger along the trigger axis within the trigger receptacle.

* * * * *